United States Patent [19]

Kirsch

[11] Patent Number: 4,710,306

[45] Date of Patent: Dec. 1, 1987

[54] REMOVING OR DECREASING IRON-CAUSED YELLOW COLOR IN A SOLUTION

[75] Inventor: Warren B. Kirsch, Baton Rouge, La.

[73] Assignee: Ethyl Corporation, Richmond, Va.

[21] Appl. No.: 693,661

[22] Filed: Jan. 22, 1985

[51] Int. Cl.$^4$ .................. B01D 21/00; E21B 43/00
[52] U.S. Cl. ..................... 252/8.551; 210/702; 210/912; 210/917
[58] Field of Search .......... 252/8.5 B, 8.55 R, 8.55 B; 210/702, 912, 917, 724

[56] References Cited

U.S. PATENT DOCUMENTS

| | | | |
|---|---|---|---|
| 2,218,053 | 10/1940 | Schwabe et al. | 210/702 |
| 2,238,930 | 4/1941 | Chamberlain et al. | 166/300 X |
| 4,071,450 | 1/1978 | Paul | 210/912 X |
| 4,292,183 | 9/1981 | Sanders | 252/8.55 |
| 4,419,246 | 12/1983 | Jayawant | 210/912 X |
| 4,465,598 | 8/1984 | Darlington et al. | 210/912 X |
| 4,472,285 | 9/1984 | Carley et al. | 210/737 |
| 4,515,699 | 5/1985 | Oliver et al. | 252/8.55 |

FOREIGN PATENT DOCUMENTS

| | | | |
|---|---|---|---|
| 46-23491 | 7/1971 | Japan | 210/912 |
| 53-20659 | 2/1978 | Japan | 210/912 |

*Primary Examiner*—Herbert B. Guynn
*Attorney, Agent, or Firm*—Donald L. Johnson; John F. Sieberth; W. G. Montgomery

[57] ABSTRACT

A process for decolorizing iron-caused yellow color in brine solutions comprising adding a small amount of a soluble metal salt such as alugenite to the brine solution, neutralizing the solution and then filtering the solution to obtain a solution of a desired degree of clarity.

20 Claims, No Drawings

REMOVING OR DECREASING IRON-CAUSED YELLOW COLOR IN A SOLUTION

BACKGROUND OF THE INVENTION

1. Field of the Invention

The present invention is directed to a method for removing or decreasing an iron-caused yellow color from a solution. More particularly, this invention is a process for removing or decreasing the amount of iron-caused yellow color in calcium bromide completion fluids such as those used in oil or gas wells by adding a relatively small amount of alugenite.

2. Description of the Prior Art

Clear, high density brines such as calcium bromide fluids are used in oil well completions and workovers. They are also used as oil well packer fluids. Packer fluids are the fluids which are left in the annular space between the tubing and casing of oil wells. The primary purpose of these fluids is to balance the pressure in the well so as to prevent a well "blow out" without losing the fluid to the formation, and without damaging the formation as is done when solids-laden fluids are used. The densities required by these brines are determined by the well pressures and depths.

Oil well brines are usually prepared by blending different amounts and types of salt solutions to get the required density and composition at the lowest cost. Such brines must be clear, that is, free of solids or solids-forming materials. Sometimes these brines have color immediately after preparation and the amount of color may increase with time. Alternatively, color can be acquired upon aging or upon blending various brines. Brines are oftentimes blended to obtain a desired density. The cause of the color is not always apparent. Color related problems may have originated in the brine manufacturing process or impurities of some type may be "picked-up" during shipping, storing, handling or during the use of the brine "down-hole" in a hot oil well. Sometimes the color problem arises because of ferric ions in the brine.

The problem of color removal in calcium bromide brines is of particular interest. Calcium bromide brines can be prepared in a number of ways yet, generally, some degree of color is imparted to the brine irrespective of the exact method of preparation. Metal bromides such as calcium bromide can be prepared by contacting a basic alkaline earth metal compound in an aqueous medium with bromine in the presence of a lower alkanol as a reducing agent. Calcium bromide brines can also be prepared using hydrogen bromide and lime.

U.S. Pat. No. 4,083,942 discloses the preparation of alkali and alkaline earth metal bromides by reacting a basic compound of an alkali or alkaline earth metal with a reducing agent in the presence of water followed by the addition of alternate portions of bromine and a basic compound while maintaining the pH at less than 7.0.

More recently, it was disclosed in U.S. Pat. No. 4,248,850 that alkali and alkaline earth metal bromides could be prepared by contacting in an aqueous medium a basic metal compound and bromine in the presence of added formaldehyde as a reducing agent.

In U.S. Pat. No. 3,431,068, there is disclosed a method of preparing alkali metal halides but not alkaline earth metal halides by reacting an alkali metal hydroxide with an elemental halogen in a liquid, saturated aliphatic or alicyclic alcohol or ketone, or a saturated aliphatic aldehyde. According to this process, the formation of unwanted halate salt by-products associated with alkali metal halide production is diminished or eliminated.

In making calcium bromide from lime and hydrogen bromide, or lime plus bromine and a reducing agent, the solution is made strongly acid to remove any traces of calcium hydroxide from the lime residue of aluminum, silicon or hydrated iron oxides. Upon neutralizing with caustic or lime, ferric ions in solution precipitate as $Fe(OH)_3$ and are removed by filtration, generally leaving a color free solution. Sometimes an undesirable yellow color persists. Such color may occur because the $Fe(OH)_3$ is colloidal, or because the process of nucleation and/or coagulation to form particles sufficiently large to be removed by filtration may be very slow in such non-ideal solutions.

It is economically advantageous to treat new or used metal bromide solutions in a manner which eliminates color. U.S. Ser. No. 408,035 filed Aug. 13, 1982 now U.S. Pat. No. 4,472,285, claims the use of zinc metal to remove color causing iron impurities from a brine. Sodium borohydride may also be used to decolorize the brine. It is desirable to keep these completion fluids clear and colorless with minimal cost.

Such solutions to the color problem have disadvantages in that they are expensive and/or troublesome.

Accordingly, an object of the present invention is to remove or decrease iron-caused yellow color from solutions such as a brine.

SUMMARY OF THE INVENTION

The present invention provides a method for decolorizing or removing iron-caused yellow color from solutions, such as brine solutions by adding a relatively small amount of a soluble aluminum salt to the solutions, adjusting the pH to neutral, and filtering to remove precipitated ferric hydroxide and aluminum hydroxide.

DESCRIPTION OF THE PREFERRED INVENTION

This invention is directed to a process for removing or decreasing the iron-caused yellow color of a solution comprising adding to the solution a decolorizing or color reducing agent such as alugenite or other soluble aluminum salt, to the solution in a sufficient amount to remove or decrease the amount of color present in the solution by hastening the formation of ferric hydroxide (after neutralization) which can be removed by filtration. The addition of alugenite or other aluminum salts gives rise to a slight acidity as a result of the hydrolysis reaction. Additionally, a precipitate forms comprising aluminum hydroxide and calcium sulfate. Neutralization with caustic or sodium hydroxide causes additional precipitate to form which is presumably a mixture of aluminum hydroxide and ferric hydroxide.

Although the invention is particularly directed to the removal of iron-caused yellow color in calcium bromide fluids, any solution containing iron-caused yellow color may be treated in the manner taught by the present invention. The degree of color removal will depend on the type of solution to be treated and the amount of soluble aluminum salt used.

Color is frequently a problem for brines used in oil wells. Typical salts found in brines include calcium chloride, calcium bromide, zinc chloride, zinc bromide, sodium chloride, sodium bromide, potassium chloride, potassium bromide, and the like, including mixtures thereof. Impurities may arise in the preparation of a brine. Oftentimes, the impurities do not cause a noticeable color change until the brine is blended with another salt solution. The purpose of the blending procedure is to obtain a solution having a specific density. The density is determined by the amount of each salt present. Due to the relatively high cost of high density brine, there is a strong incentive to reuse the solution. Recovered brine, having been down-hole in an oil well, frequently acquires color rendering it generally unsuitable for reuse.

Brines, especially those containing calcium bromide, oftentimes acquire a yellow appearance after standing. This phenomena may be caused by iron ions in the solutions. Brown solids may also come out of the solution. It has been discovered that addition of a decolorizing agent such as alugenite $[Al_2—(SO_4)_3.18H_2O]$ or other soluble aluminum salt to these discolored brines removes or decreases the undesirable color caused by iron ions in the solution, after the solution is neutralized and filtered. Treatment with caustic provides the neutralization, but also adds additional precipitate. Filtering removes this precipitate as well as that resulting from the addition of the aluminum salt.

The decolorizing agent used in the practice of the present invention is preferably alugenite. Any other soluble aluminum salt may be used.

After the alugenite is added to the solution, caustic is added to neutrality. The neutralized solution is then filtered to remove all precipitates.

Although not wishing to be bound by any particular theory, it is believed that the formation of aluminum hydroxide or other metal hydroxide tends to cause ferric hydroxide to co-precipitate.

No heat is required and only mild agitation is necessary. Alugenite is non-toxic, safe and easy to handle. It is relatively inexpensive.

In addition to soluble aluminum salts, other soluble metal salts such as those of magnesium, silicon, or the like may also be used. It is essential that the metal salt be one which forms a very insoluble metal hydroxide at the near neutral point.

The amount of soluble metal salt used in the practice of the present invention is sufficient to eliminate or decrease the amount of color present in the solution. The preferred amount of alugenite or the like is dictated by the type of solution selected, the amount of iron color-causing impurities present and the degree of color decrease desired. Generally, the amount of alugenite ranges from about 25 to 5000 parts per million (ppm), preferably 50 to 1000 ppm and more preferably 75 to 100 ppm.

The addition of the decolorizing agent to the solution is conducted at a temperature high enough to cause the reaction to proceed, yet not so high as to adversely affect the course of the reaction. The addition is most conveniently carried out at room temperature. The addition is generally conducted under ambient pressures since these are most economical. However, reaction pressure is not critical.

For commercial used, in addition to the required density, a calcium bromide solution should have a pH value of 6.5 to 7.5 and an APHA color measurement of 125 or less.

The following examples illustrate the process of adding soluble metal salts to a brine having an iron caused yellow color to decrease such color. The examples are merely illustrative and in no manner intended to limit the invention described herein.

The calcium bromide tested was a regular commercial high density calcium bromide solution of about 15.2 pounds per gallon which did not meet required specifications as to color. The solution had a dark yellow color. It could not be decolorized with hydroxylamine hydrochloride The calcium bromide solution was filtered, using a Celite filter aid. No visible improvement in the color was observed. The supernatant fluid was dark, but clear and had an APHA color number of 300. Analysis of the solution showed the following:

| Element | Parts per million |
| --- | --- |
| Zinc | 12 |
| Iron | 9.4 |
| Manganese | 18 |
| Aluminum | 0.6 |

EXAMPLE 1

Color Reduction Using Alugenite

A 150 gram sample of the calcium bromide was warmed and stirred. An approximately 50 wt. percent aqueous solution of alugenite, $Al_2(SO_4)_3.18H_2O$, and water was prepared. From this solution, 0.3 ml (about 0.15 g of alugenite) was removed and added to the calcium bromide sample. The mixture was stirred for about three minutes and appeared close to white in color. After 10 minutes, three drops of 50% caustic were added. Both the addition of the alugenite and the caustic caused lumps of white precipitate to form which was not readily dispersed. After heating and stirring, briefly, Celite filter aid was added and the mixture was filtered. The pH of the filtrate was measured at 7.4. The APHA color number was 75. Analysis showed the following parts per million: Zn—16; Fe—4.9; Mn–18; and Al—8.

EXAMPLE 2

Color Reduction With Alugenite

To 150 grams of the same dark calcium bromide solution, 0.2 ml of the alugenite solution (containing about 0.1 g of alugenite) was slowly added below the liquid level of the hot, stirred calcium bromide solution. This resulted in better dispersion of the precipitate which had formed. Caustic (one drop of 50 percent caustic diluted with 0.15 ml of water) was added in same way. The mixture was stirred briefly. Temperature was estimated at 50° C. The mixture was filtered using a filter aid. The pH of the filtrate measured 7.5 and the APHA color number was 25. Analysis showed the following parts per million: Zn—14; Fe-0.5; Mn-18; and Al-7.

EXAMPLE 3

Color Reduction with Zinc

A small vial containing about 10 ml of the same dark calcium bromide fluid was warmed and a pinch of zinc dust was added. The vial was shaken briefly and the mixture was filtered using a filter aid. The filtrate was water white. Analysis showed the following parts per million: Zn-340; Fe-0.4; Mn-12; and Al-0.6.

EXAMPLE 4

Color Reduction With Sulfuric Acid

To 150 grams of the same dark calcium bromide solution, 0.1 ml of 6N sulfuric acid was added. The mixture was heated and stirred. In three increments, 0.1 ml of dilute caustic was added. The mixture was then filtered using a filter aid. The pH of the filtrate was measured to be 8.8 and the APHA color number was determined to be 175. Analysis showed the following parts per million; Zn-13; Fe-7.1; Mn-12; and Al-0.6.

In each instance, the pH of the solutions were measured after dilution with nine parts of distilled water.

Filtration may also be carried out by settling or any other suitable manner. The term as used herein includes all such suitable means of separation of solids from liquids.

The foregoing disclosure and description of the invention is illustrative and explanatory thereof and various changes in the illustrated process may be made within the scope of the appended claims without departing from the spirit of the invention.

I claim:

1. A process for removing or decreasing the amount of iron-caused yellow color in a solution, comprising adding to the solution a decolorizing agent, which is a soluble aluminum salt which forms a very insoluble hydroxide at the near neutral pH point, in a sufficient amount to remove or decrease the amount of color present in said solution after the solution has been neutralized and filtered, raising the pH of the solution containing the soluble salt to near neutral, and filtering the near neutral pH solution to remove any precipitate in said solution, thereby forming a substantially clear solution.

2. A process, as recited in claim 1, wherein said solution is a brine containing at least one salt selected from the group consisting of calcium chloride, calcium bromide, zinc chloride, zinc bromide, sodium chloride, sodium bromide, potassium chloride, potassium bromide and mixtures thereof.

3. A process, as recited in claim 1, wherein said solution contains calcium bromide.

4. A process, as recited in claim 1, wherein said decolorizing agent is alugenite.

5. A process, as recited in claim 1, wherein said decolorizing agent is aluminum sulfate.

6. A process, as recited in claim 1, wherein the amount of soluble metal salt is about 25 to 5000 parts per million.

7. The process of claim 1, wherein neutralization is obtained by adding sodium hydroxide to the decolorizing agent treated solution in a sufficient amount to obtain the desired degree of neutralization.

8. A process as recited in claim 1, wherein the filtered solution or filtrate has a pH of 6.5 to 7.5 and an AHPA color number of about 125 or less.

9. A process for removing or decreasing iron-caused yellow color from a high density brine used in oil wells, said brine containing at least one salt selected from the group consisting of calcium chloride, calcium bromide, zinc chloride, zinc bromide, sodium chloride, sodium bromide, potassium chloride, potassium bromide and mixtures thereof, said process comprising in order:

(a) adding to said brine a decolorizing agent which is a soluble salt of aluminum, which forms a very insoluble hydroxide at near neutral pH, in a sufficient amount ot remove or decrease the amount of color present in said brine, after neutralization and filtration of the brine;

(b) raising the pH of said brine to near neutral; and (c) filtering said brine to remove any precipitates in said brine, thereby forming a substantially clear brine.

10. A process, as recited in claim 9, wherein said brine contains calcium bromide.

11. A process, as recited in claim 9, wherein said decolorizing agent is soluble aluminum sulfate.

12. A process, as recited in claim 9, wherein said decolorizing agent is alugenite.

13. A process as recited in claim 9, wherein the filtered brine has a pH of 6.5 to 7.5 and an AHPA color number of about 125 or less.

14. The process of claim 9, wherein neutralization is obtained by adding sodium hydroxide to the decolorizing agent treated brine in a sufficient amount to obtain the desired degree of neutralization.

15. A process for removing or decreasing the amount of iron-caused yellow color in a calcium bromide solution, comprising the steps of:

a. Adding to the calcium bromide solution, a decolorizing agent which is a soluble aluminum salt which forms a very insoluble hydroxide at near neutral pH, in a sufficient amount to remove or effectively decrease the amount of color present in the calcium bromide solution after steps "b" and "c" have been completed;

b. adding to the decolorizing agent treated calcium bromide solution a sufficient amount of sodium hydroxide or caustic to raise the pH of the calcium bromide solution to near neutral; and c. filtering the near neutral pH calcium bromide solution and obtaining a calcium bromide filtrate substantially free of precipitated solids.

16. The process of claim 15, wherein the decolorizing agent is alugenite.

17. The process of claim 15, wherein the decolorizing agent is soluble aluminum sulfate.

18. The process of claim 15, wherein the decolorizing agent is added to the calcium bromide solution in an amount of about 25 to 5,000 parts per million.

19. The process of claim 15, wherein the calcium bromide filtrate of step "c" has a pH of 6.5 to 7.5.

20. The process of claim 15, wherein the calcium bromide filtrate of step "c" has an AHPA color number of about 125 or less.

* * * * *